United States Patent Office 3,189,607
Patented June 15, 1965

3,189,607
NEW AMINOALKYLTHIOACYLPHENO-
THIAZINES
Ernst Habicht and Hans Müller, Schaffhausen, Switzerland, assignors to Cilag-Chemie Limited, Schaffhausen, Switzerland, a Swiss company
No Drawing. Filed July 10, 1962, Ser. No. 208,931
Claims priority, application Switzerland, Aug. 11, 1961, 9,435/61
5 Claims. (Cl. 260—243)

The present invention relates to new organic sulfur compounds. In particular the invention relates to substances of the general formula

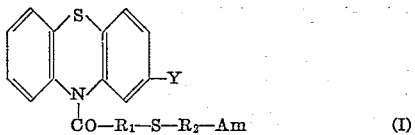

wherein $R_1$ and $R_2$ represent lower alkylene radicals, Am represents a secondary or tertiary amino group and Y hydrogen or chlorine. $R_1$ and $R_2$ represent alkylene radicals which contain together not more than 6 carbon atoms, Am a lower alkylamino or dialkylamino group, a pyrrolidino or piperidino group or a N'-alkylpiperazino group.

The new sulfur compounds and their acid addition salts of the Formula I have anaesthetic and spasmolytic effect, antiinflammatory effect, narcosis potentiating effect and temperature lowering effect, and antagonize the effect of histamine. They can be used to increase the activity of various pharmaca as analgetics, hypnotics, anaesthetics, spasmolytics. The compounds of the Formula I have also a psychotropic effect, particularly as sedative.

Furthermore, the substances of the Formula I have a fungistatic and bacteriostatic effect. The N-quaternary, the N-quaternary and S-ternary salts respectively have the same effect, partially intensified.

The new above defined sulfur compounds can be prepared by reacting a compound of the formula

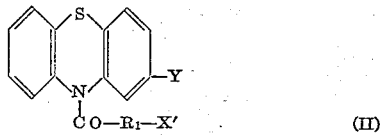

with a compound of the formula

the symbols $R_1$, $R_2$ and Am having the above cited meaning, while one of the symbols X' means a reactive splittable radical, as for instance halogen and the other one represents the thiol group or the thiol group in salt form.

According to this method, a halogenoparaffin carboxylic acid phenothiazide, obtained in the usual way, can be reacted with a secondary or tertiary aminoalkanethiol or with an alkali metal salt of such an aminoalkanethiol. Instead of a halogenoparaffin carboxylic acid phenothiazide, also an aryl- or alkyl-sulfonyloxyparaffin carboxylic acid phenothiazide can be used.

A preferential method is to mix a halogenoparaffin carboxylic acid phenothiazide with a secondary or tertiary aminoalkanethiol in a lower fatty acid nitrile, preferably acetonitrile. The reaction is started without external heating and can be terminated by slightly heating. When cooling down, the hydrohalogenide of the formed aminoalkylmercapto-paraffinoyl - phenothiazine crystallizes and can easily be isolated.

According to known manner, it is also possible to react a mercaptoparaffin carboxylic acid phenothiazide, which is obtained by reaction of a phenothiazine with a thioglycolic acid or a homolog thereof, with an aminoalkylhalogenide; thereby working in the presence of basic condensing agents, for instance alkali metal alcoholates in alcohols.

As already mentioned, the preferential method is the reaction of halogenoacyl-phenothiazides with secondary or tertiary aminoalkanethiols in an aliphatic nitrile, preferably acetonitrile, thereby directly obtaining the hydrohalides of the end products.

There can, for instance, be reacted: 10-chloroacetyl-phenothiazine, 10-α-chloropropionyl-phenothiazine, 10-β-bromopropionyl - phenothiazine, 10-γ-bromobutyroyl-phenothiazine or the corresponding 3-chloroderivatives with dimethylamino - ethanethiol, diethylamino - ethanethiol, di-n-propylamino-ethanethiol, di-isopropyl-aminoethanethiol, di-n-butylamino - ethanethiol, pyrrolidino-thanethiol, piperidino-ethanethiol, and the corresponding propanethiols, for instance β-dimethylaminopropanethiol, γ-dimethylamino-propanethiol, as well as the secondary amino-ethanethiols, such as for instance ethylamino-ethanethiol, propylamino-ethanethiol, butylamino-ethanethiol.

Instead of the 10-chloroacetyl-phenothiazines, also the α-halogenopropionyl or the β-halogenopropionyl compounds can be used as mentioned previously.

The sulfur compounds thus formed of the formula mentioned above can or shall preferably be isolated in form of their salts of non-toxic inorganic or organic acids.

The inorganic acids used for the salt formation are: sulfuric acid, hydrochloric acid, hydrobromic acid, phosphoric acids; as organic acids are used: acetic acid, glycolic acid, citric acid, succinic acid, fumaric acid, maleic acid, dioxymaleic acid, methanesulfonic acid, hydroxyethanesulfonic acid, salicylic acid, undecylenic acid.

The sulfur compounds thus obtained can also be transformed into their N-quaternary, N-quaternary and S-ternary salts respectively.

When working with molar quantities of quaternizing agent, there are preferably obtained the N-quaternary salts. If working with excess of quaternizing agent, then the N-quaternary and S-ternary salts are obtained. As quaternizing agents are used: hydrohalide esters of aliphatic and araliphatic alcohols, for instance alkylhalogenides, alkenylhalogenides, aralkylhalogenides. Instead of halogenides of alcohols, it is also possible to use the alkanesulfonic acid esters thereof. We prefer lower alkyl ammonium and sulfonium chlorides, bromides and sulfates.

The quaternization can be carried out in a solvent, for instance in ethylacetate, ether, dioxane.

*Example 1*

60 g. of phenothiazine are transferred in the usual way in the 10-chloroacetyl compound by means of 54 g. of chloroacetyl chloride [cf. Acta Chem. Scand. 3, pp. 302–303 (1949)]. 20 g. of the chloroacetyl compound thus obtained are dissolved in 100 c. of hot redest. acetonitrile. The solution is cooled and 8 g. of dimethylaminoethanethiol are added. The reaction starts under self-heating. The whole is held for 15 minutes at 45° C. under turbinating and is then cooled to 10° C. After a few hours, the hydrochloride of the formed 10-[(β-dimethylamino-ethyl-thio)-acetyl]-phenothiazine is sucked off and washed with ether. There are obtained 24 g. of hydrochloride, melting at 184–185° C. The base can be freed from the hydrochloride by means of alkalies; melting point of the base: 65–67° C.

Example 2

In the same manner as described in Example 1 there are obtained from 20 g. of 10-chloroacetyl-phenothiazine and 10 g. of diethylaminoethanethiol 25 g. of hydrochloride of the 10-[(β-diethylaminoethyl-thio)-acetyl]-phenothiazine, melting at 189–191° C. The base can be freed by means of alkalies and melts at 61–62° C.

Example 3

In the same manner as described in Example 1 there are obtained from 19.3 g. of 10-chloroacetyl-phenothiazine and 10.7 g. of piperidinoethanethiol 26 g. of 10-[(β-piperidinoethylthio)-acetyl]-phenothiazine, melting at 76–79° C. From the base there is prepared in acetone the hydrochloride, which crystallizes from isopropanol and melts at 176–177° C.

Example 4

From 19.3 g. of 10-chloroacetyl-phenothiazine and 9.65 g. of pyrrolidinoethanethiol in 50 cc. of acetonitrile there is obtained the 10-[(β-pyrrolidinoethylthio)-acetyl]-phenothiazine (26 g.) which metls at 90–91° C. The hydrochloride of the base melts at 136–137° C.; it can be recrystallized from isopropanol.

Example 5

18.6 g. of 10-chloroacetyl-3-chloro-phenothiazine are reacted in the usual manner with 9.2 g. of piperidinoethanethiol. There are obtained 22.9 g. of 10-[(β-piperidinoethylthio)-acetyl]-3-chlorophenothiazine, recrystallizing from petroleum ether, and melting at 81–82° C. The hydrochloride melts, recrystallized form ether/isopropanol, at 176–178° C.

Example 6

From 21.7 g. of 10-chloroacetyl-3-chloro-phenothiazine and 7.7 g. of dimethylamino-ethanethiol there are obtained 20.4 g. of 10-[(β-dimethylaminoethylthio)-acetyl]-3-chlorophenothiazine. The base can easily be recrystallized from petroleum ether and melts, thus purified, at a temperature of 76–78° C. The hydrochloride melts at 194–195° C.; it can be recrystallized from isopropanol.

Example 7

From 21.7 g. of 10-chloroacetyl-3-chloro-phenothiazine and 9.8 g. of diethylamino-ethanethiol there are obtained 29 g. of 10-[(β-diethylaminoethylthio-acetyl]-3-chlorophenothiazine. After recrystallization from petroleum ether the base melts at 69–72° C. The hydrochloride prepared with the aid of ethereal hydrochloric acid melts at 99° C. After recrystallization from isopropanol/ether, the hydrochloride melts at 101–103° C.

As described in the examples there can further be prepared:

10-α-(β'-1-methyl-piperazinyl-4-ethyl-thio)-acetyl-phenothiazine

10-α-(β'-dimethylamine-ethyl-thio)-propionyl-phenothiazine

10-α-(β'-diethylamine-ethyl-thio)-propionyl-phenothiazine

10-α-(β'-pyrrolidino-ethyl-thio)-propionyl-phenothiazine

10-α-(β'-piperidino-ethyl-thio)-propionyl-phenothiazine

10-β-(β'-dimethylamino-ethyl-thio)-propionyl-phenothiazine

10-β-(β'-diethylamino-ethyl-thio-propionyl-phenothiazine

10-β-(β'-di-N-propylamino-ethyl-thio)-propionyl-phenothiazine

10-β-(β'-pyrrolidino-ethyl-thio)-propionyl-phenothiazine

10-β-(β'-piperidino-ethyl-thio)-propionyl-phenothiazine

What we claim is:

1. A chemical compound selected from the group consisting of phenothiazine derivatives having the formula:

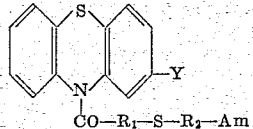

wherein $R_1$ and $R_2$ represent lower alkylene radicals which together contain not more than 6 carbon atoms; Am is selected from the group consisting of mono-lower alkylamino, di-lower alkylamino, pyrrolidino, piperidino and N-lower alkyl-piperazino and Y is selected from the group consisting of hydrogen and chlorine atoms; and the pharmaceutically acceptable acid addition salts thereof.

2. A compound of the formula

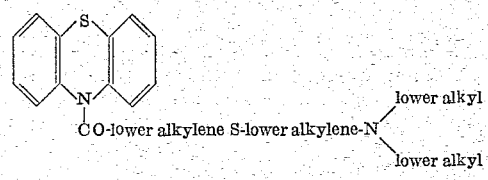

3. A compound of the formula

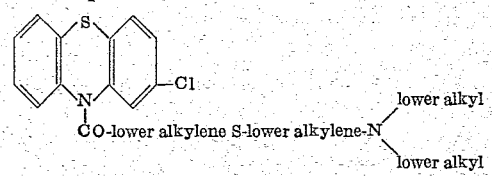

4. The compound: 10-[(β-dimethylaminoethylthio)-acetyl]-phenothiazine.

5. The compound: 10-[(β-pyrrolidinoethylthio)-acetyl]-phenothiazine.

References Cited by the Examiner

UNITED STATES PATENTS

| | | | |
|---|---|---|---|
| 2,951,077 | 8/60 | Myers et al. | 260—243 |
| 2,989,529 | 6/61 | Schuler | 260—243 |
| 3,074,939 | 1/63 | Davis | 260—243 |

OTHER REFERENCES

Lowy et al.: "An Introduction to Organic Chemistry," 6th edition, page 213, John Wiley and Sons (copyright 1945).

IRVING MARCUS, *Primary Examiner.*

NICHOLAS S. RIZZO, WALTER A. MODANCE, *Examiners.*